(12) United States Patent
Kato et al.

(10) Patent No.: US 6,336,582 B1
(45) Date of Patent: Jan. 8, 2002

(54) METHOD OF MANUFACTURING MULTIPLE KINDS OF PRODUCTS IN ARBITRARILY SELECTED ORDER IN ONE MANUFACTURING LINE

(75) Inventors: Chitoshi Kato; Tadashi Tobita; Takeshi Nakamura, all of Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/679,887

(22) Filed: Oct. 5, 2000

(30) Foreign Application Priority Data

Jun. 12, 2000 (JP) .............................................. 12-175472

(51) Int. Cl.$^7$ .............................................. B23K 31/12
(52) U.S. Cl. ........................ 228/102; 228/175; 228/176; 228/47.1; 228/6.1; 228/4.1
(58) Field of Search ................................ 228/102, 175, 228/176, 47.1, 6.1, 4.1

(56) References Cited

U.S. PATENT DOCUMENTS

| | | | | |
|---|---|---|---|---|
| 4,223,201 A | * | 9/1980 | Peters et al. | 219/121 LC |
| 4,441,645 A | | 4/1984 | Takagishi et al. | 228/47 |
| 4,611,749 A | * | 9/1986 | Kawano | 228/176 |
| 5,188,276 A | * | 2/1993 | Furuya et al. | 228/6.1 |
| 5,548,096 A | * | 8/1996 | Akasaka et al. | 219/117.1 |

FOREIGN PATENT DOCUMENTS

| | | | |
|---|---|---|---|
| EP | 0438989 | 7/1991 | |
| FR | 2788996 | 8/2000 | |
| GB | 1564669 | 4/1980 | |
| GB | 2122142 | 1/1984 | |
| GB | 237904 | * 9/2000 | ... B62D/65/00 ... |

* cited by examiner

*Primary Examiner*—M. Alexandra Elve
(74) *Attorney, Agent, or Firm*—Armstrong, Westerman, Hattori, McLeland & Naughton, LLP (57) ABSTRACT

In a method of manufacturing multiple kinds of products in an arbitrarily selected order in one manufacturing apparatus, the rate of operation of the welding robots to be disposed in each of assembly lines for each of parts is improved, the cost for equipment investment is reduced, and the time required to introduce a new kind of motor vehicle into the manufacturing apparatus is shortened, whereby the productivity is improved. The manufacturing apparatus is made up of: a plurality of part assembly lines for assembling a plurality of parts; a combining station for tack-welding these parts to thereby assemble a product; and a reinforce-welding line for reinforce-welding the product. The number of welding points for welding each of the parts in the respective assembly lines is made equal to one another for all kinds of vehicles. Those welding points of each of the parts which fall short of a required number of welding points are welded in the reinforce-welding line.

1 Claim, 7 Drawing Sheets

METHOD OF MANUFACTURING MULTIPLE KINDS OF PRODUCTS IN ARBITRARILY SELECTED ORDER IN ONE MANUFACTURING LINE

BACKGROUND OF THE INVENTION

1. Field of the Invention

The present invention relates to a method of manufacturing multiple kinds of products in an arbitrarily selected order (in a mixed order) in one manufacturing apparatus by combining, through welding, a plurality of parts belonging to each of the multiple kinds of products, such as floors of multiple kinds of motor vehicles.

2. Description of Related Art

Conventionally, a floor of a motor vehicle is assembled by combining, through welding, a front component which constitutes an engine room, a front floor which constitutes a floor section of a vehicle compartment, and a rear floor which constitutes a floor section of a trunk portion.

In manufacturing the floor of a motor vehicle, the following steps are conventionally taken. Namely, in each of the assembly lines for assembling therein the front component, the front floor, and the rear floor, respectively, the welding of all of the welding points of a plurality of constituting members which constitute each of the parts is performed, whereby each of the parts is assembled. Then, the assembled front component, the front floor, and the rear floor are tack-welded to thereby assemble the floor. Thereafter, in a reinforce-welding line, the reinforce-welding is performed to the connecting portions among the parts.

The required number of welding points which are required for assembling each of the parts, such as the front component, the front floor, and the rear floor, varies with the kind (or type) of the vehicle. Therefore, in the conventional method in which all of the welding points of each of the parts are welded in the respective assembly lines, the following becomes necessary. Namely, when the vehicle floors for multiple kinds of vehicles are manufactured in an arbitrarily selected order in one manufacturing apparatus, the number of welding robots to be disposed in each of the part assembly lines must be decided based on that part of the kind of vehicle which has the largest number of welding points. As a result, when the kind of the vehicle which has a smaller number of welding points is being manufactured, the availability factor (or the rate of operation) of the welding robots becomes smaller. When a new kind of vehicle which has a larger number of welding points is introduced into the manufacturing apparatus, the respective part assembly lines must be modified. As a result, the cost for equipment investment becomes large and the time for modification is required. They become a hindrance to the improvement in the productivity.

In view of the above points, the present invention has an object of providing a method of manufacturing multiple kinds of products in an arbitrarily selected order in one manufacturing apparatus, in which the rate of operation of the welding robots is improved and the cost for equipment investment at the time of introducing a new kind of vehicle into the manufacturing apparatus is reduced.

SUMMARY OF THE INVENTION

In order to attain the above and other objects, the present invention is a method of manufacturing multiple kinds of products in an arbitrarily selected order in one manufacturing apparatus by combining, through welding, a plurality of parts belonging to each of the multiple kinds of products, the method comprising the steps of: combining, through welding, a plurality of members constituting the parts in a part assembly line which is prepared for each of the parts to thereby assemble each of the parts; tack-welding the plurality of parts to thereby assemble the products; and thereafter reinforce-welding the products in a reinforce-welding line, wherein a number of welding points of each of the parts in each of the part assembly lines is made equal to one another for all of the multiple kinds of products, and wherein those welding points of each of the parts which fall short of a required number of welding points are welded in the reinforce-welding line.

According to the present invention, the number of welding points of each of the parts in each of the part assembly lines does not vary with different kinds of the products. Therefore, the rate of operation of the welding robots disposed in each of the part assembly lines does not become lower even when the kind of the product changes. In addition, when a new kind of product, whose parts have a larger number of welding points than the parts of the existing kind of product have, is introduced into the manufacturing apparatus, it is sufficient to modify only the reinforce-welding line, and the modification to each of the part assembly lines is not required any more. Further, the welding points of a plurality of parts in the reinforce-welding line can be performed by the common welding robots. Therefore, as compared with the arrangement in which the number of welding robots is increased in each of the part assembly lines, the number of increase in the welding robots may be smaller. As a result, the cost of equipment investment at the time of newly introducing a new kind of product into the manufacturing apparatus, can be reduced and the time therefor can also be shortened.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
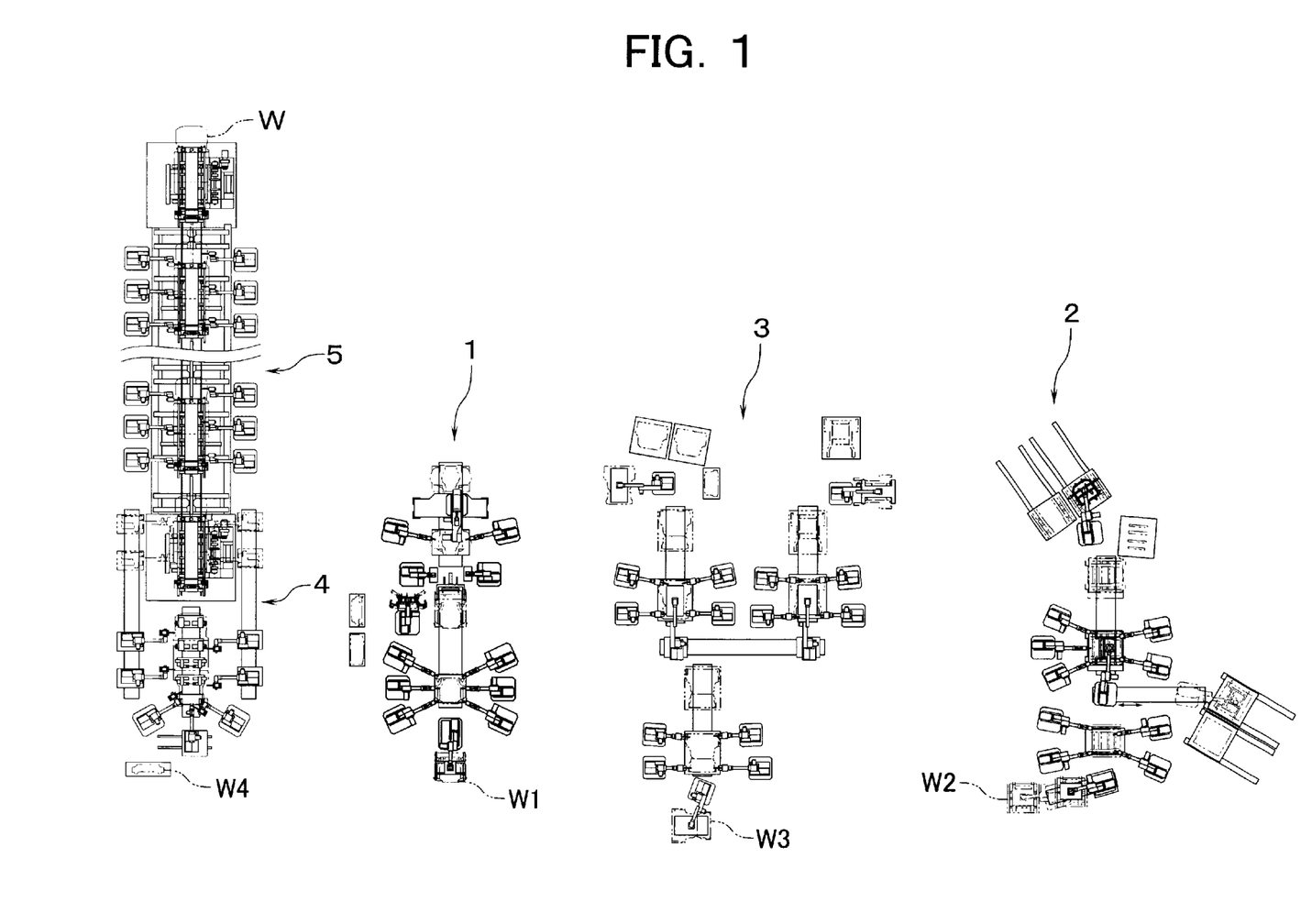
FIG. 1 is a plan view showing that manufacturing apparatus for manufacturing vehicle floors which is used in carrying out the present invention.

FIG. 1 shows a manufacturing apparatus for manufacturing a product in the form of a floor W of a motor vehicle. This manufacturing apparatus has: an assembly line 1 for assembling a front component W1; an assembly line 2 for assembling a front floor W2; an assembly line 3 for assembling a rear floor W3; a combining station 4 for combining, through tack-welding, the front component W1, the front floor W2 and the rear floor W3 to thereby assemble the floor W; and a reinforce-welding line 5 for reinforce-welding the floor W. Each assembly line is also referred to as "a part assembly line."

Figure 2:
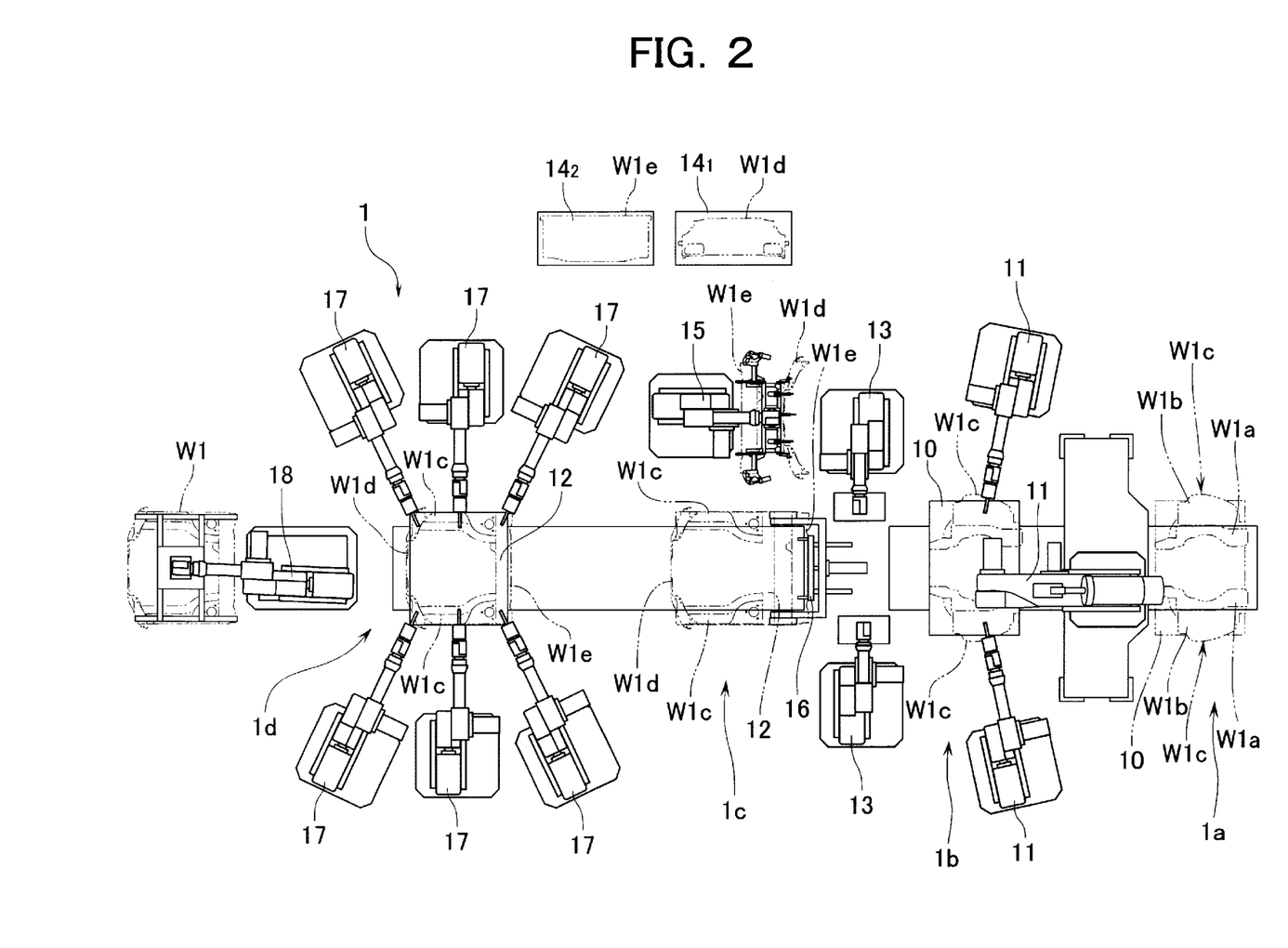
FIG. 2 is an enlarged plan view of that assembly line for assembling a front component which constitutes a part of the above-described apparatus.

In the assembly line 1 for assembling the front component W1, there are provided the following as shown in FIG. 2: i.e., a first setting station 1a; a first assembly station 1b; a second setting station 1c; and a second assembly station 1d. There is provided a first setting cart 10 which is movable back and forth between the first setting station 1a and the first assembly station 1b. In the first setting station 1a, left and right front side frames W1a, W1a and left and right front wheel houses W1b, W1b are set onto the first setting cart 10 and, thereafter, the setting cart 10 is moved to the first assembly station 1b. In the first assembly station 1b, each of the left and right front side frames W1a and each of the left and right front wheel houses W1b are respectively welded together by means of welding robots 11 to thereby assemble each of the left and right frame side members W1c. Further, there is provided a second setting cart 12 which is movable back and forth between the second setting station 1c and the second assembly station 1d. In the second setting station 1c, left and right front side members W1c, W1c are set onto the second setting cart 12 by means of a pair of transfer robots 13, 13. In addition, a bulkhead W1d and a dashboard lower member W1e which are placed on supporting tables $14_1$, $14_2$ are picked up by a transfer robot 15. The bulkhead W1d is set to a front end of both the front side members W1c, W1c and the dashboard lower member W1e is set, through a transfer device 16, to a rear end of both the front side members W1c, W1c. Thereafter, the second setting cart 12 is moved to the second assembly station 1d. In this second assembly station 1d, the left and right front side members W1c, W1c, the bulkhead W1d, and the dashboard lower member W1e are combined through welding to thereby assemble the front component W1. This front component W1 is discharged to a transfer means (not illustrated) by means of a transfer robot 18. Each of the setting carts 10, 12 and a robot hand of each of the transfer robots 13, 18 are exchangeable depending on the kind of the vehicle. It is thus so arranged that the front components W1 of multiple kinds of vehicles can be assembled in an arbitrarily selected order or in a mixed order in the assembly line 1.

Figure 3:
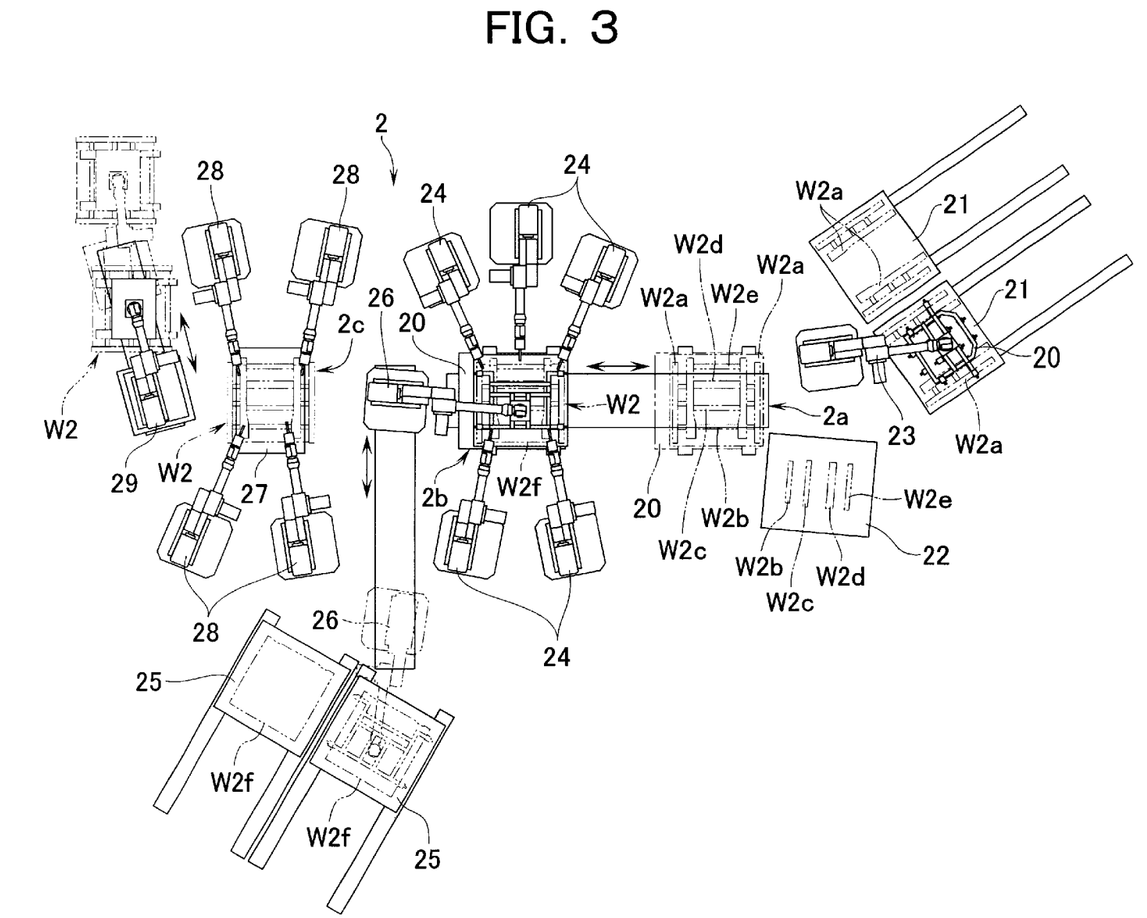
FIG. 3 is an enlarged plan view of that assembly line for assembling a front floor which constitutes a part of the above-described apparatus.

In the assembly line 2 for assembling the front floor W2, there are provided the following as shown in FIG. 3, i.e., a setting station 2a; an assembly station 2b; and a reinforce-welding station 2c. There is disposed a setting cart 20 which is movable back and forth between the setting station 2a and the assembly station 2b. Left and right side sills W2a, W2a which are fed by a feeding device 21, and a plurality of cross members W2b–W2e 4, which are placed on a supporting table 22 are picked up by a transfer robot 23. These side sills W2a and the cross members W2b–W2e are set onto the setting cart 20 which is in the setting station 2a. Thereafter, the setting cart 20 is moved to the assembly station 2b. In this assembly station 2b, the side sills W2a and the cross members W2b–W2e are combined together through welding by means of welding robots 24, whereby a frame assembly is assembled. A panel member W2f which is fed by a feeding device 25 is picked up by a self-propelled transfer robot 26. After the frame assembly has been assembled in the assembly station 2b, the panel member W2f is set onto the frame assembly. The panel member W2f and the frame assembly are welded together by means of the welding robots 24 to thereby assemble the front floor W2. Then, this front floor W2 is transferred by the transfer robot 26 to a setting jig 27 which is disposed in the reinforce-welding station 2c. In this reinforce-welding station 2c, reinforce-welding is performed on the front floor W2 by means of welding robots 28. Thereafter, the front floor W2 is discharged to a transfer means (not illustrated) by means of a transfer robot 29. Here, the setting cart 20 and a robot hand of each of the transfer robots 23, 26, 29 are exchangeable depending on the kind of the vehicle. In addition, the setting jig 27 is constituted by a general-purpose jig in which the positions of the workpiece holding members on the setting jig 27 are adjustable. It is thus so arranged that the front floors W2 for multiple kinds of vehicles can be assembled in an arbitrarily selected order in the assembly line 2.

Figure 4:
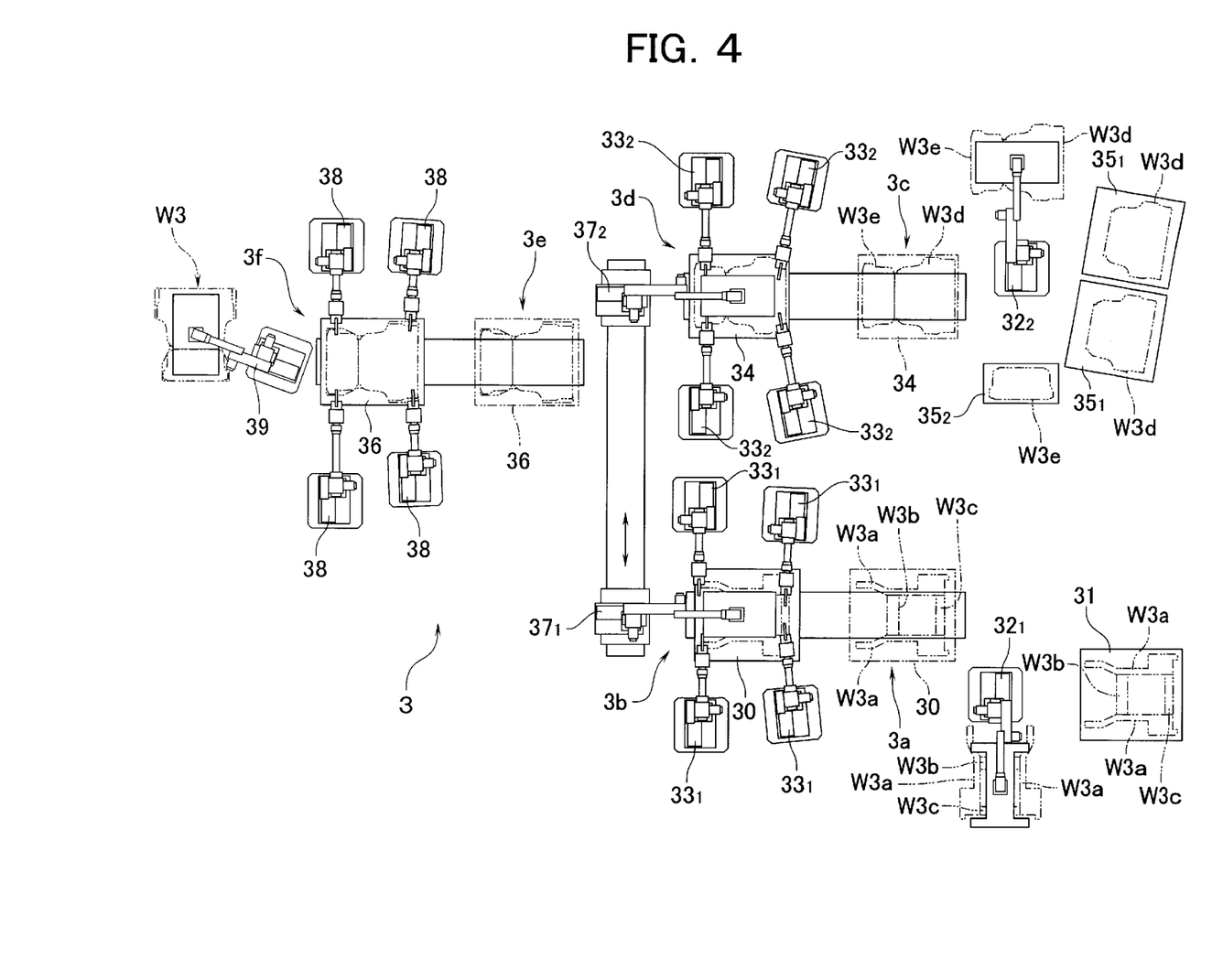
FIG. 4 is an enlarged plan view of that assembly line for assembling a rear floor which constitutes a part of the above-described apparatus.

In the assembly line 3 for assembling the rear floor W3, there are provided the following as shown in FIG. 4, i.e., a first setting station 3a; a first assembly station 3b which lies in front of the first setting station 3a; a second setting station 3c which lies on one lateral side of the first setting station 3a; a second assembly station 3d which lies in front of the second setting station 3c; a third setting station 3e which lies in front of the second assembly station 3d; and a third assembly station 3f which lies in front of the third setting station 3e. There is provided a first setting cart 30 which is movable back and forth between the first setting station 3a and the first assembly station 3b. Side frames W3a, W3a and a pair of front and rear cross members W3b, W3c, all being disposed on a supporting table 31, are picked up by a transfer robot $32_1$ to thereby set them onto the first setting cart 30 which is in the first setting station 3a. Thereafter, the first setting cart 30 is moved to the first assembly station 3b. In this first assembly station 3b, the side frames W3a and the cross members W3b, W3c are combined through welding by means of welding robots 33, to thereby assemble a frame assembly. In addition, there is further provided a second setting cart 34 which is movable back and forth between the second setting station 3c and the second assembly station 3d. A main panel W3d and a subpanel W3e which are placed on supporting tables $35_1$, $35_2$ are picked up by a transfer robot $32_2$. The main panel W3d and the subpanel W3e are set onto the second setting cart 34 which is in the second setting station 3c. Thereafter, the second setting cart 34 is moved to the second assembly station 3d. In this second assembly station 3d, the main panel W3d and the subpanel W3e are combined through welding by means of welding robots 332 to thereby assemble a panel assembly. There is still further provided a third setting cart 36 which is movable back and forth between the third setting station 3e and the third assembly station 3f. The frame assembly that has been assembled in the first assembly station 3b is set onto the third setting cart 36 which is in the third setting station 3e by means of a self-propelled transfer robot $37_1$. Also, the panel assembly that has been assembled in the second assembly station 3d is set onto the frame assembly by means of a transfer robot $37_2$. Thereafter, the third setting cart 36 is transferred to the third assembly station 3f. In this third assembly station 3f, the frame assembly and the panel assembly are combined through welding by means of welding robots 38 to thereby assemble the rear floor W3. The assembled rear floor W3 is discharged to a transfer means (not illustrated) by means of a transfer robot 39. Here, each of the setting carts 30, 34, 36 and a robot hand of each of the transfer robots $32_1$, $32_2$, $37_1$, $37_2$, 39 is exchangeable depending on the kind of the vehicle. It is thus so arranged that the rear floors W3 of multiple kinds of vehicles can be assembled in an arbitrarily selected order in the assembly line 3.

Figure 5:
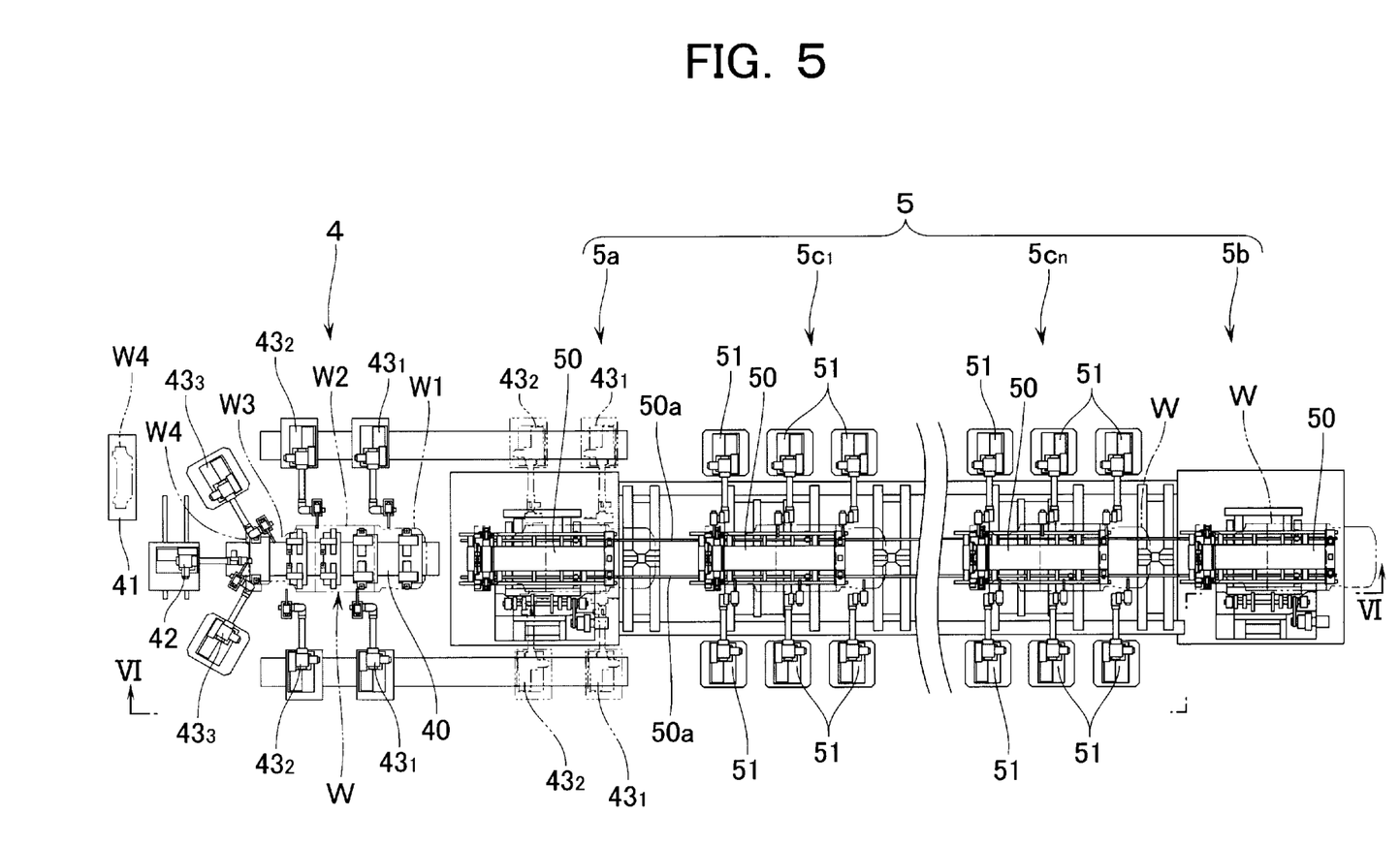
FIG. 5 is an enlarged plan view of those combining stations and reinforce-welding line which constitute parts of the above-described apparatus.
Figure 6:
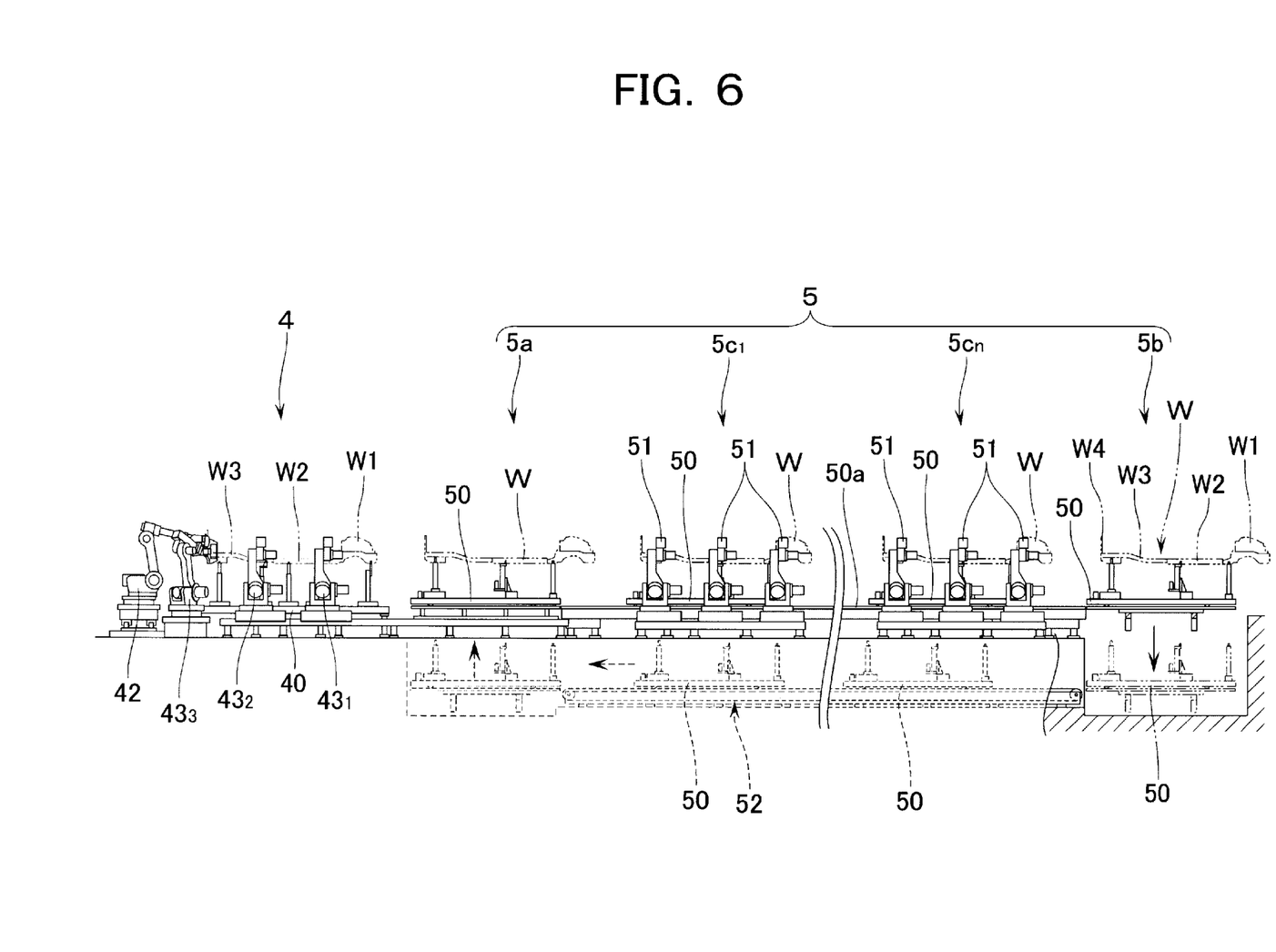
FIG. 6 is a side view of the combining station and the reinforce-welding line as seen in a direction of an arrow VI in FIG. 5.

Details of the combining station 4 and the reinforce-welding line 5 are shown in FIGS. 5 and 6. The front component W1, the front floor W2, and the rear floor W3 that have respectively been assembled in each of the above-described assembly lines 1, 2, 3 are transferred by a transfer means into the combining station 4. The front component W1, the front floor W2, and the rear floor W3 are set onto a setting jig 40 which is disposed in the combining station 4 by a transfer means (not illustrated) in a predetermined positional relationship with one another. Also, the rear panel W4 which is placed on a supporting table 41 is set to a rear end of the rear floor W3 by a transfer robot 42. These front component W1, the front floor W2, the rear floor W3, and the rear panel W4 are tack-welded by a total of three welding robots $43_1$, $43_2$, $43_3$ which are disposed in a back and forth direction on each of the left and right sides of the combining station 4 to thereby assemble the floor W. Here, the setting jig 40 is constituted by a general-purpose jig in which the positions of the workpiece holding members on the setting jig 40 are adjustable. Floors W of multiple kinds of vehicles can thus be assembled in an arbitrarily selected order in the combining station 4.

In the reinforce-welding line 5, there are provided: that feeding station 5a on a starting end which is adjacent to the combining station 4; a discharge station 5b on a terminal end of the reinforce-welding line 5; and a plurality of welding stations $5c_1$–$5c_n$ which are disposed between the feeding station 5a and the discharge station 5b. Further, there are provided a plurality of carts 50 which are intermittently fed from the feeding station 5a toward the discharge station 5b along guide rails 50a. The welding robot 43, on a front endmost position and the intermediate welding robots $43_2$ of each of the left and right sides in the combining station 43 are constituted into self-propelled dual-purpose robots which perform a dual purpose of welding and transporting. The floor W which has been assembled in the combining station 4 is transported by these dual-purpose welding robots $43_1$, $43_2$ to the feeding station 5a to thereby set it onto the cart 50. The cart 50 is sequentially moved to each of the welding stations $5c_1$–$5c_n$ and, after reinforce-welding has been performed by welding robots 51 which are disposed on both sides of each of the welding stations $5c_1$–$5c_n$, the floor W is picked up from the cart 50 by a transfer device (not illustrated) in the discharge station 5b. Empty carts 50 are returned to the feeding station 5a through a return path 52 under a floor of the reinforce-welding line 5. Here, each of the carts 50 is constituted by a general-purpose cart in which the positions of workpiece holding members for holding the workpiece on the cart 50 are adjustable. It is thus so arranged that the reinforce-welding of multiple kinds of floors W can be performed in the reinforce-welding line 5.

Figure 7A:
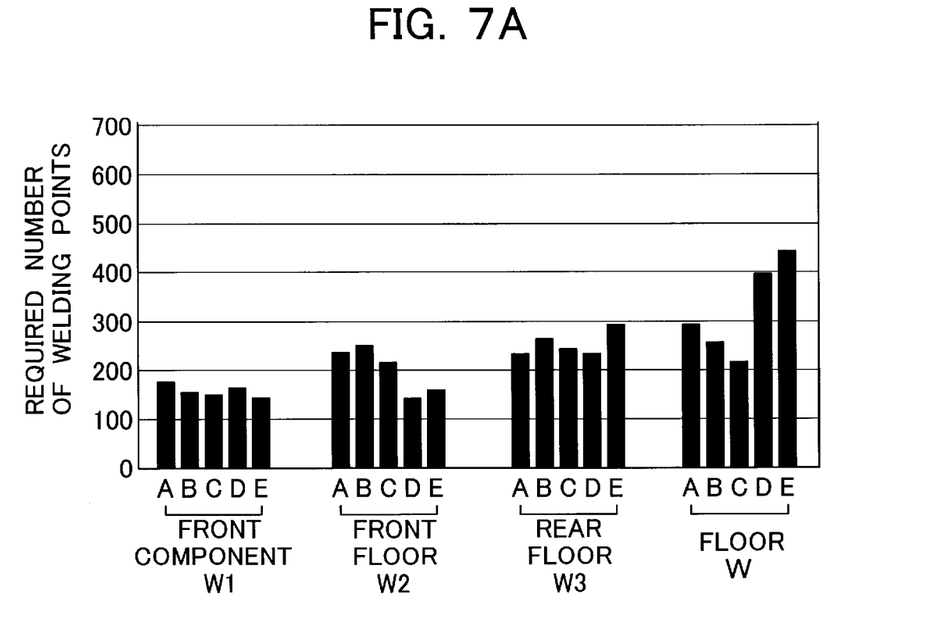
FIG. 7A is a graph showing the required number of welding points in each of the parts made up of the front component, the front floor, and the rear floor.

Now, the required number of welding points of the front component W1, the front floor W2, and the rear floor W3 varies with the kind of the vehicle. Also, the required number of welding points which are necessary to secure the strength as the floor W, by combining through welding these parts W1, W2 and W3 to form the floor W, varies with the kind of the vehicle. FIG. 7A shows the required number of welding points of each of the parts W1, W2, W3 of five different kinds (A, B, C, D, E) of vehicles as well as the required number of welding points of the floor W. As can be seen from FIG. 7A, the required numbers of welding points in the front floor W2 and in the rear floor W3 largely vary with the kind of the vehicle. For example, when a comparison is made in the front floor W2, the difference between the kind B vehicle and the kind D vehicle in the required number of welding points in the front floor W2 amounts to 100 or more. In the rear floor W3, the difference between the kind E vehicle and the kind A vehicle in the required number of welding points amounts to 60 or more. When all of the welding points of each of the parts W1, W2, W3 are performed in the assembly lines 1, 2, 3 for respectively assembling the parts W1, W2, W3, it becomes necessary to dispose in each of the assembly lines 1, 2, 3 that number of welding robots which suits the kind of the vehicle in which the required number of welding points becomes maximum. When the front floor W2 for the D kind of vehicle is assembled in the assembly line 2 for the front floor W2, or when the rear floor W3 for the A kind of vehicle is assembled in the assembly line 3 for the rear floor W3, the rate of operation of the welding robots remarkably lowers.

Figure 7B:
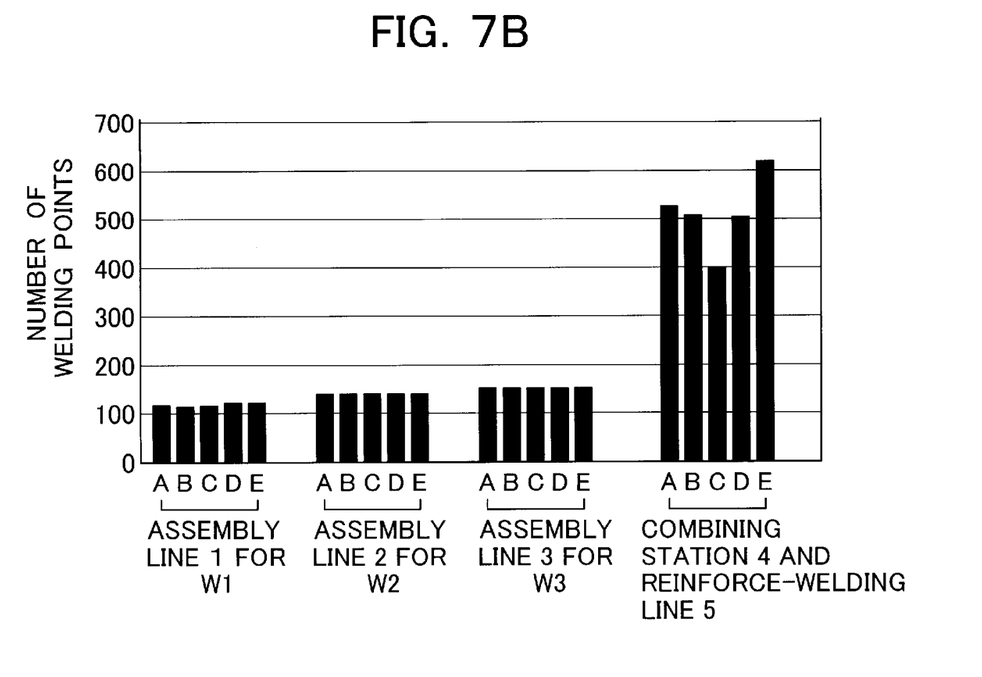
FIG. 7B is a graph showing the number of welding points for each kind of vehicle in each of the assembly lines as well as in the combining station and the reinforce-welding line.

As a solution, in the present embodiment, the minimum required number of welding that is required to prevent each of the parts W1, W2, W3 from deforming during transportation is performed in each of the assembly lines (i.e., part assembly lines) 1, 2, 3. As shown in FIG. 7B, the numbers of welding points of each of the parts W1, W2, W3 in the respective assembly lines 1, 2, 3 are unified or made equal to one another for all kinds of the vehicles. Then, the welding of those numbers of welding points which fall short of the required number of welding points for each of the parts W1, W2, W3 is performed in the reinforce-welding line 5.

According to this arrangement, a minimum required number of welding robots need be disposed in each of the assembly lines 1, 2, 3 irrespective of the difference in the required number of welding points for each of the parts W1, W2, W3. The rate of operation of the welding robots can thus be improved. In this connection, it becomes necessary to increase the number of welding robots to be disposed in the reinforce-welding line 5. However, the welding of each of the parts W1, W2, W3 in the reinforce-welding line 5 can be performed by common welding robots. Therefore, as compared with the arrangement in which the welding robots are increased in number in each of the assembly lines 1, 2, 3 to suit the maximum number of welding points, the total number of welding robots can be reduced.

In case a new kind of vehicle in which the required number of welding points for each of the parts W1, W2, W3 thereof is larger than the existing kinds of vehicles is introduced, the increase in the number of welding points can be absorbed in the reinforce-welding line 5. As a result, the assembly lines 1, 2, 3 for each of the parts W1, W2, W3 need not be modified. Therefore, the cost of investment at the time of introducing the new kind of vehicle can be reduced and the time required for the introduction can also be shortened.

An explanation has so far been made about the embodiment in which the present invention is applied to the manufacturing of multiple kinds of floors W for the motor vehicles in an arbitrarily selected order in one manufacturing line. The present invention can, however, be applied to the manufacturing of multiple kinds of products other than the floors W of the motor vehicles.

As can be seen from the above-described explanations, according to the present invention, there occurs no difference in the number of welding points in each of the parts in the assembly lines for the respective parts. Therefore, the rate of operation of the welding robots to be disposed in the assembly lines for the respective parts does not lower. In addition, when a new kind of vehicle is introduced into the manufacturing apparatus, the modification to the respective part assembly lines is no longer required. Therefore, the cost for equipment investment can be reduced and the time can also be shortened, resulting in a large improvement in the productivity.

It is readily apparent that the above-described method of manufacturing plural kinds of products in an arbitrarily selected order in the manufacturing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing multiple kinds of products in an arbitrarily selected order in one manufacturing apparatus by combining, through welding, a plurality of parts belonging to each of said multiple kinds of products, said method comprising of steps of:

combining, through welding, a plurality of members constituting each of the parts in each of part assembly lines which is prepared for each of the parts to thereby assemble each of the parts;

tack welding the plurality of parts to thereby assemble the products; and thereafter, reinforce-welding the products in a reinforce-welding line, said combining step including the further step of using a uniform number of welding points for each of the parts in each of said part assembly lines for all of said multiple kinds of products, and when the number of welding points of each of the parts are reduced from a required number of welding points, welding the parts at each of the reduced number of welding point in said reinforce-welding line.

* * * * *